(12) United States Patent
Garcia Elena

(10) Patent No.: US 9,908,032 B2
(45) Date of Patent: Mar. 6, 2018

(54) ONE-PERSON VEHICLE FOR URBAN TRANSPORT

(71) Applicant: LA REVOLTA DISSENY DE MOBILITAT, S. L., Barcelona (ES)

(72) Inventor: Xavier Garcia Elena, Barcelona (ES)

(73) Assignee: LA REVOLTA DISSENY DE MOBILITAT, S. L., Barcelona (ES)

( * ) Notice: Subject to any disclaimer, the term of this patent is extended or adjusted under 35 U.S.C. 154(b) by 0 days.

(21) Appl. No.: 15/325,326

(22) PCT Filed: Jul. 10, 2015

(86) PCT No.: PCT/IB2015/055230
§ 371 (c)(1),
(2) Date: Jan. 10, 2017

(87) PCT Pub. No.: WO2016/005953
PCT Pub. Date: Nov. 4, 2016

(65) Prior Publication Data
US 2017/0182398 A1    Jun. 29, 2017

(30) Foreign Application Priority Data
Jul. 11, 2014 (ES) .................. 201431050

(51) Int. Cl.
*A63C 17/12* (2006.01)
*A63C 17/01* (2006.01)
(Continued)

(52) U.S. Cl.
CPC .......... *A63C 17/12* (2013.01); *A63C 17/0046* (2013.01); *A63C 17/012* (2013.01);
(Continued)

(58) Field of Classification Search
CPC ..... A63C 17/12; A63C 17/265; A63C 17/012; A63C 17/017; A63C 17/014;
(Continued)

(56) References Cited

U.S. PATENT DOCUMENTS

D252,346 S    7/1979   Solheim
4,775,162 A   10/1988  Chao
(Continued)

FOREIGN PATENT DOCUMENTS

EP    1391225 A1    2/2004

OTHER PUBLICATIONS

International Preliminary Report on Patentability for International Application No. PCT/IB2015/055230; The International Bureau of WIPO; Geneva, Switzerland; dated Jan. 17, 2017.
(Continued)

*Primary Examiner* — Thomas Ingram
(74) *Attorney, Agent, or Firm* — Thomas E. Lees, LLC

(57) ABSTRACT

One-person vehicle (1) for urban transport comprising a transport deck (2) for one user of the vehicle (1), trucks (3) for the displacement of said transport deck (2), and control arms (4) for said trucks (3) which are attached to said transport deck (2) so that they can pivot with respect to said trucks (3) when the user swings the deck (2) for changing the traveling direction of the vehicle (1), and is characterized by the fact that each of said trucks (3) comprises a pivot (5) to be inserted into one of said control arms (4) and a damper assembly (19) which is interposed between the pivot (5) and the arm (4) rotating about said pivot (5), allowing said damper assembly (19) to compensate on said arm (4) the weight force that swings the deck (2) and to drive the return to the centre of said arm (4) when said force yields.

19 Claims, 9 Drawing Sheets

(51) Int. Cl.
*A63C 17/00* (2006.01)
*G05D 1/00* (2006.01)
*A63C 17/26* (2006.01)

(52) U.S. Cl.
CPC .......... *A63C 17/014* (2013.01); *A63C 17/017* (2013.01); *A63C 17/265* (2013.01); *G05D 1/0011* (2013.01); *A63C 2203/12* (2013.01); *A63C 2203/18* (2013.01); *A63C 2203/20* (2013.01); *A63C 2203/22* (2013.01); *A63C 2203/42* (2013.01)

(58) Field of Classification Search
CPC ............ A63C 17/0046; A63C 2203/22; A63C 2203/12; A63C 2203/18; A63C 2203/20; A63C 2203/42; G05D 1/0011
See application file for complete search history.

(56) References Cited

U.S. PATENT DOCUMENTS

| | | | |
|---|---|---|---|
| 5,263,725 A * | 11/1993 | Gesmer | A63C 17/0093 280/11.28 |
| 5,794,955 A | 8/1998 | Flynn | |
| D398,358 S | 9/1998 | Jeffreys | |
| D413,954 S | 9/1999 | Gerlach | |
| 5,997,018 A | 12/1999 | Lee | |
| 6,102,415 A | 8/2000 | Stewardson | |
| D444,197 S | 6/2001 | Augustin | |
| D505,704 S | 5/2005 | Ying | |
| D509,871 S | 9/2005 | Lee | |
| 7,374,179 B2 | 5/2008 | Cole | |
| 8,251,384 B1 | 8/2012 | Christensen et al. | |
| 8,696,000 B1 | 4/2014 | Chen | |
| D735,828 S | 8/2015 | Lai | |
| 2003/0127816 A1* | 7/2003 | Schnuckle | A63C 11/023 280/87.042 |
| 2005/0012290 A1 | 1/2005 | McClain | |
| 2005/0051984 A1 | 3/2005 | Williams | |
| 2005/0280231 A1 | 12/2005 | Gallipoli | |
| 2006/0213711 A1 | 9/2006 | Hara | |
| 2010/0301572 A1 | 12/2010 | Newton | |
| 2010/0327546 A1 | 12/2010 | Nelson et al. | |
| 2011/0140385 A1* | 6/2011 | Fraley | A63C 17/012 280/87.042 |
| 2013/0081891 A1 | 4/2013 | Ulmen et al. | |
| 2014/0151972 A1 | 6/2014 | Williams | |
| 2014/0262574 A1* | 9/2014 | Rodgers | A63C 17/12 180/167 |
| 2017/0203193 A1* | 7/2017 | Powell | A63C 17/012 |

OTHER PUBLICATIONS

Chin, Cynthia M.; Notice of Allowance for U.S. Appl. No. 29/532,888; dated Mar. 15, 2017; United States Patent and Trademark Office; Alexandria, VA.

European Patent Office; International Search Report for International Application No. PCT/IB2015/055230; Rijswijk, Netherlands; dated Oct. 13, 2015.

European Patent Office; Written Opinion of the International Searching Authority for International Application No. PCT/IB2015/055230; Munich, Germany; dated Oct. 13, 2015.

Spanish Patent Office; Search Report for Spanish patent application No. 201431050; dated Oct. 21, 2015.

* cited by examiner

ONE-PERSON VEHICLE FOR URBAN TRANSPORT

CROSS REFERENCE TO RELATED APPLICATIONS

This application is a § 371 National Stage Entry Application of International Application No. PCT/IB2015/055230, filed Jul. 10, 2015, published as "ONE-PERSON VEHICLE FOR URBAN TRANSPORT", which claims the benefit of ES Application No. P201431050, filed Jul. 11, 2014, the disclosures of which are hereby incorporated by reference.

BACKGROUND

The present invention relates to a one-person vehicle for urban transport. It is a vehicle that is configured as a skateboard provided with a transport deck, trucks for the displacement of the transport deck and control arms for said trucks which are attached to the ends of the transport deck.

On the market there a large number of one-person vehicles that are configured as skateboards, with a transport deck, displacement trucks with wheels, and control aims for said trucks that are attached at one end to the transport deck and at the other end to one of these trucks. Said control arms are pivoted in relation to the trucks when the user swings the deck by weight force to easily manoeuvre or change the direction of vehicle travel.

To compensate for the weight force that swings the deck and in order to facilitate the return of the deck to the centre, the skateboards described include a "bushing" element interposed between the deck and the control arms. However, it has been observed that to manoeuvre or optimally change travelling direction of these vehicles it is necessary to substantially swing the deck to ensure that the weight force of the user conveniently modifies the direction of travel of the wheels. This means that in practice the vehicle is complex to manoeuvre and only suitable for users having special abilities to drive it.

Some one-person vehicles such as those described in the preceding paragraph include a motor which drives one of the truck wheel axles. However, in these cases the vehicle weight is usually very great and, in most cases, it is necessary to include gears and belts that take up space, misadjust and require much maintenance. In practice, there are no one-person vehicles on the market configured as a skateboard that can be easily used to move around the city, and that are lightweight, strong, compact and easy to use by any user.

BRIEF SUMMARY

The aim of the present invention is to provide a one-person vehicle for urban transport which is stable and easy to manoeuvre, so it can be used by a wide range of users without the users needing to possess special skills to drive it.

According to this objective, the present invention provides a one-person vehicle for urban transport comprising a transport board for one user of the vehicle, trucks for the displacement of said transport deck, and truck control arms which are connected to said transport deck so that they can pivot with respect to said trucks when the user swings the deck to change the direction of vehicle travel. This vehicle is characterized by the fact that each of said trucks comprises a pivot to be inserted into a control arm and a damper assembly that is interposed between the pivot and the arm rotating about said pivot assembly, allowing said damper assembly to compensate on said arm the weight force that swings the deck and to actuate the return to the centre of said arm when said force yields.

In the vehicle claimed, the damper assembly interposed between the truck pivot and the arm rotating on said pivot compensates the weight force of the user swinging the deck, transmitting simultaneously to the truck pivot the weight force which changes the direction of the wheels. The same damper assembly operates the return to the centre of the arm when the force that makes the deck swing yields.

As a result, unlike what happens in vehicles of the prior art, the direction of travel of the truck wheels can be optimally modified and with a greatly reduced radius of rotation of the wheel axles, without need for the user to oscillate the transport deck very markedly. Thus a stable vehicle that can be manoeuvred easily by any user obtained.

According to one embodiment, each of the trucks comprises two wheels and is connected to a control arm at one end of transport deck and, advantageously, in the use position of said vehicle, these trucks are positioned on the outside of the transport deck, each attached via the pivot to one end of a control arm.

Since the trucks and the wheels are located on the outside of the deck, the so-called "wheelbite" is avoided, namely, the wheels rubbing with transport deck during a turn.

The wheels may have a diameter of between 80 mm and 130 mm so that the vehicle is particularly useful for getting around the city. Furthermore, the materiel of the wheels is less rigid than that usually employed and the profile of the wheel is convex. The larger diameter wheels and lower hardness have the advantage that it is difficult to stop or block them with a small obstacle. On the other hand, their domed profile helps minimize the possibility of locking.

According to a preferred embodiment, the pivot of each of the trucks is a hinge axis that is configured to be inserted into a cavity at one end of control arms.

This hinge is inserted within a cavity of the arm which is provided with bearings on which said axis is supported to allow rotation.

According to the same preferred embodiment, each of the trucks comprises support arms of the wheel axles extending in longitudinal direction of the vehicle situated at a position distal to the pivot of the same truck.

Advantageously, these support arms of the wheel axles are connected configuring a "U"-shaped structure, the pivot or hinge axis of the same truck extending from the central section of said structure facing the transport deck.

Thus, the transport deck can oscillate freely without risk of touching one of the truck wheels. Furthermore, this truck configuration provides the vehicle with great stability, forming a very wide rectangular support base which can be larger than 0.2 m².

Preferably the damper assembly is interposed on both sides of the pivot axle of the truck structure in a cavity of the control arm housing said pivot or axle.

Advantageously, the damper assembly comprises a pair of springs disposed on either side of said pivot or axle, said springs being accommodated inside a cavity of the control arms receiving said pivot or axle, the walls of said cavity and axle itself acting as a physical stop for the ends of each of said springs.

Alternatively, said damper assembly comprises a spring which is disposed around said pivot or axle, and is attached by one end to said axle and the other end thereof to a surface of said control arm.

Preferably, the control arms are pivotally connected to the transport deck, the articulated joint enabling the vertical displacement of said arms to a retracted position below the transport deck.

Thus, a vehicle is obtained with a broad base of transport which gives security to the user, but at the same time can be folded to reduce its volume by 30%.

Advantageously, the ends of the transport deck define a substantially flat surface configured to place the vehicle in an upright position, once the control arms and the trucks are folded below said deck.

Thus, the vehicle remains in a vertical position, thereby facilitating transport or storage. In fact, it has been found that in the retracted position the vehicle claimed occupies 85% less floor space and can be carried in a suitcase or the like.

Again advantageously, the upper side of the transport deck has a substantially concave cross section. This concave profile enables changing direction of the vehicle without users losing the verticality, since the user has only to put pressure on the higher end of the deck with toes or heels. In conventional skateboards, the user must move his body sideways in order for the force of his weight to act.

Preferably, each of the control arms is attached to the transport deck through a hinge axis that is associated with a damping element configured to compensate the vibrations produced by the road on which the vehicle runs.

Advantageously, said damping element is interposed between transport deck and a portion of the control arm is hingedly attached to the deck.

According to one embodiment, the vehicle comprises pieces for coupling to the ends of the transport deck comprising each of said pieces a cavity which houses the hinge axis of each of the control arms and the damper element configured to be in contact with a portion of the arms.

This damping element for road vibration can be, for example, a pad of elastomeric material of predetermined thickness and hardness. This pad absorbs the impact of the vibrations caused by uneven terrain. Optionally the pad thickness can be modified to in turn vary the degree of joint opening of the control arms and thus the height of the deck and thus, the minimum turning radius of the wheels.

Alternatively, instead of a pad of elastomeric material a damping spring type element, block of compressed air or any other cushioning system that ensures the desired elastic response can be used.

According to a preferred embodiment, the control arms comprise an arm portion that is configured to snap into the cavity of the coupling pieces and locking mechanisms which prevent the accidental opening of said arm.

Thus, the rigid connection of the deck and vehicle control arms is secured when in use.

According to the same preferred embodiment, the vehicle also has a locking mechanism of the control arms, once folded below the table, in the transport position. Thus, the user can comfortably hold and transport the vehicle with its arms folded.

According to a motorized embodiment, said vehicle comprises a direct drive electric motor, preferably a permanent magnet "brushless" type motor, attached to the axle of one of the wheels of said trucks, and a battery, preferably a battery of lithium, to provide electric power to said motor.

This motor is very quiet and eliminates the need for transmission belts which can become misadjusted or break. Furthermore, the motor is very low power, about 175 W, so that the electric battery needed to drive the motor can be very small. Thus, a motorized one-person vehicle having, for example, a weight below 8 Kg and an autonomy of about 12 Km, enough for intended urban use is obtained.

Advantageously, said direct drive motor is housed inside a cylindrical casing serving as a wheel, the outer surface of said casing comprising a material which acts as a tire. Thus, a motorized wheel that is indistinguishable from the other wheels of the vehicle is obtained.

Preferably, the vehicle includes a remote control to operate the motor.

This control is configured with a reduced size to be stored in a user's pocket or in a cavity of the mast handle. Additionally, the vehicle includes processing and control means configured to drive the motor based on a signal from said remote control when the speed of the vehicle wheels exceeds a predetermined initial value.

Thus it gains in security, since the user must push the vehicle to reach an initial minimum speed before the motor drives the wheel axles, thus avoiding falls due to sudden starting of the motor.

According to one embodiment, the same processing and control means are configured for activating the motor from this control at two different predetermined speeds; a high speed, for example 12 km/h, and a low speed, for example, 7 Km/h. The user can use these two speeds in combination to show the vehicle.

According to one embodiment, said vehicle comprises a mast attached to the transport deck, said mast acting as a handle to facilitate steering control of the vehicle. Advantageously, said mast includes a "joystick" type handle ergonomically configured to control the vehicle with one hand. Optionally, the mast can unfold telescopically and/or fold to be collected on the transportation deck. The "joystick" type handle may include a cavity for receiving the remote control. Thus, the user can operate the vehicle with one hand from the "joystick" handle itself with his thumb.

In the present invention one-person urban transport vehicle means a vehicle suitable for short-range mobility, the so-called "last-mile transportation", for example, a vehicle capable of moving at a moderate speed across cities, towns, campuses, shopping centres, airports, etc. . . .

On-person vehicle means a vehicle configured to transport a single user, preferably a vehicle configured as a skateboard with a transport deck which the user stands on during travel.

BRIEF DESCRIPTION OF THE SEVERAL VIEWS OF THE DRAWINGS

For a better understanding of all that it has been outlined drawings are attached which, schematically and solely by way of non-limiting example, show a practical case of embodiment.

FIG. 7 shows the springs of the damper assembly mounted on either side of the axis acting as pivot.

In FIG. 10, the mast is folded flat on the transport table or deck.

DETAILED DESCRIPTION

Figure 1:
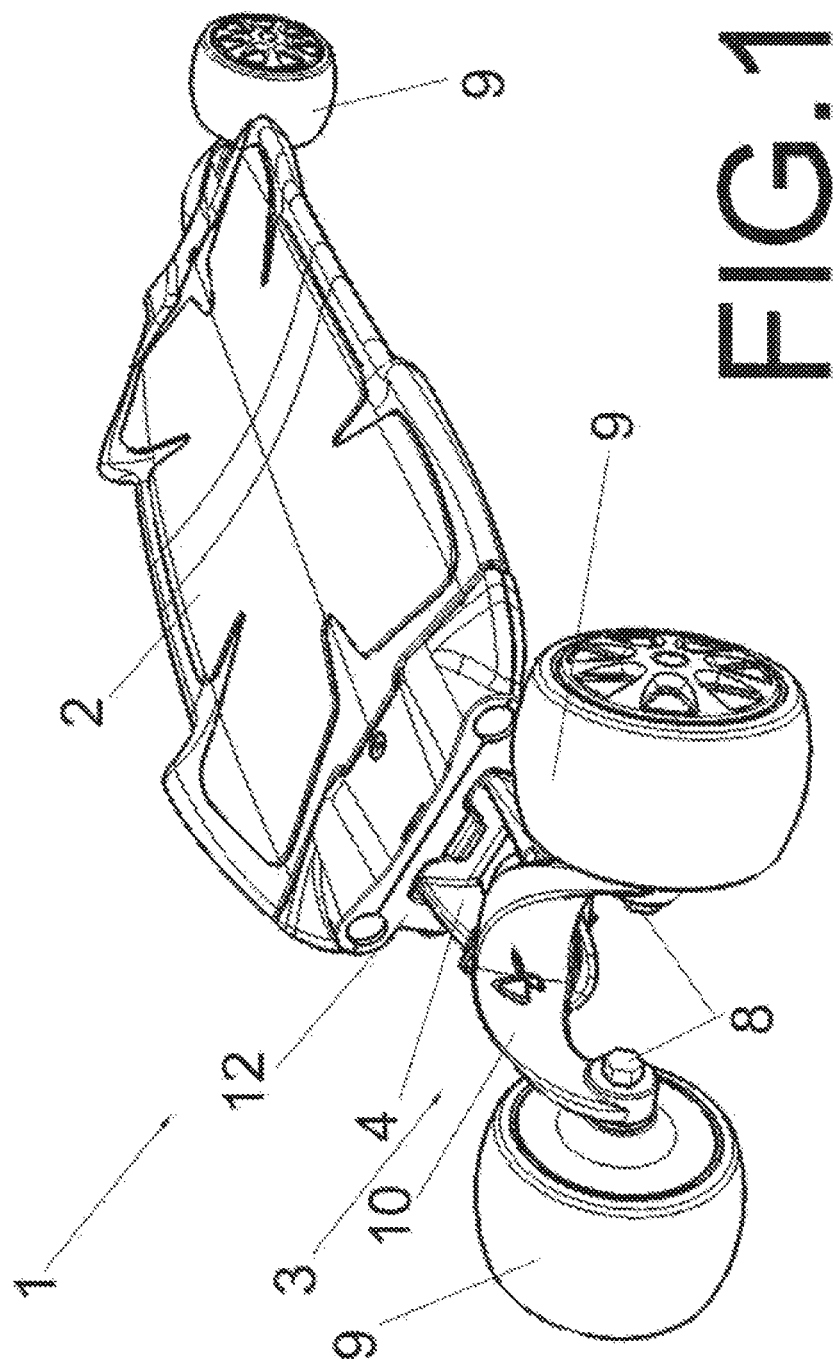
FIG. 1 shows a perspective view of an embodiment of one-person vehicle without a mast. This embodiment simulates a swing of the deck and control arms which pivot on the trucks.
Figure 2:
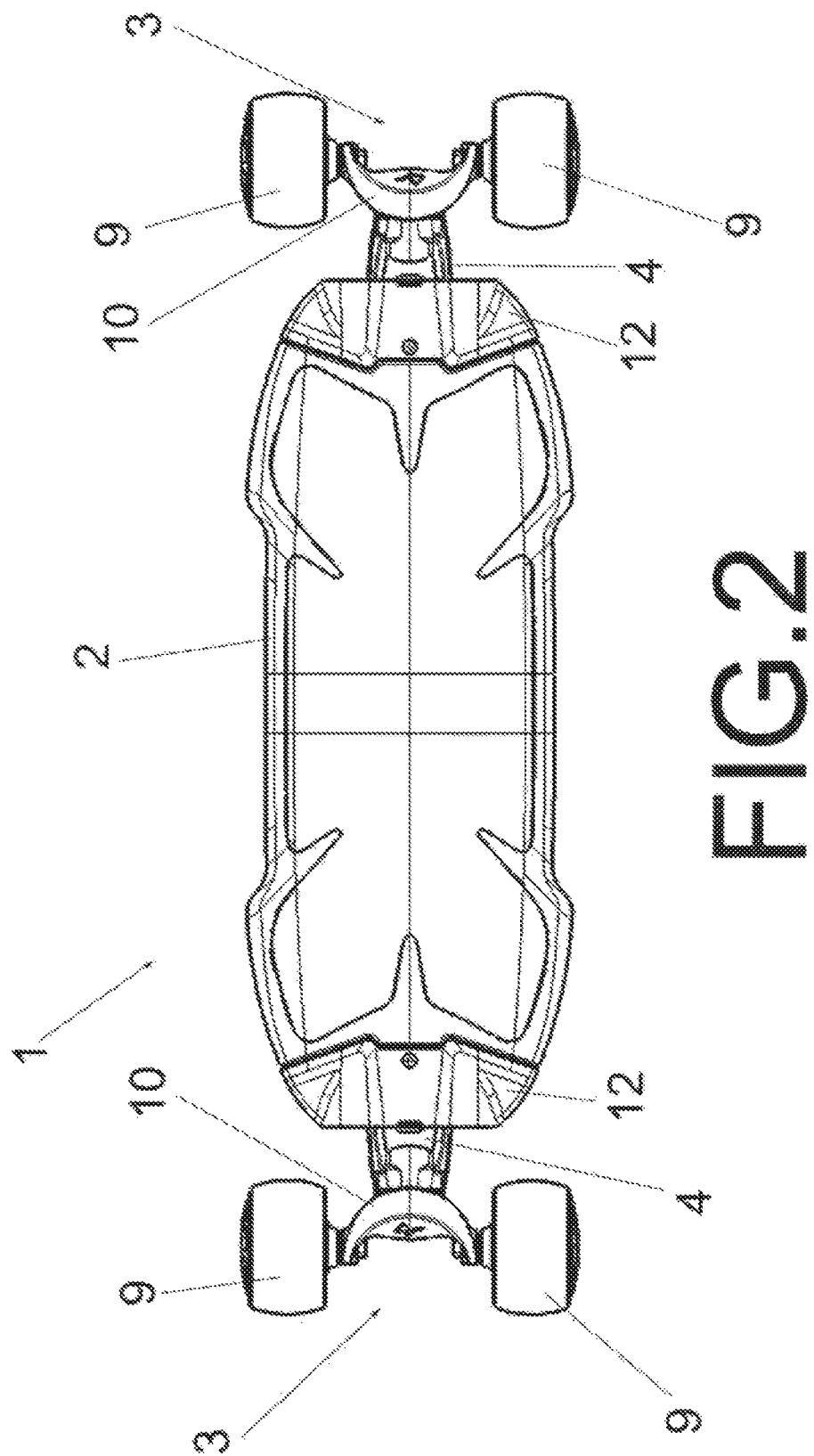
FIG. 2 shows a top view of the vehicle of FIG. 1.
Figure 3:
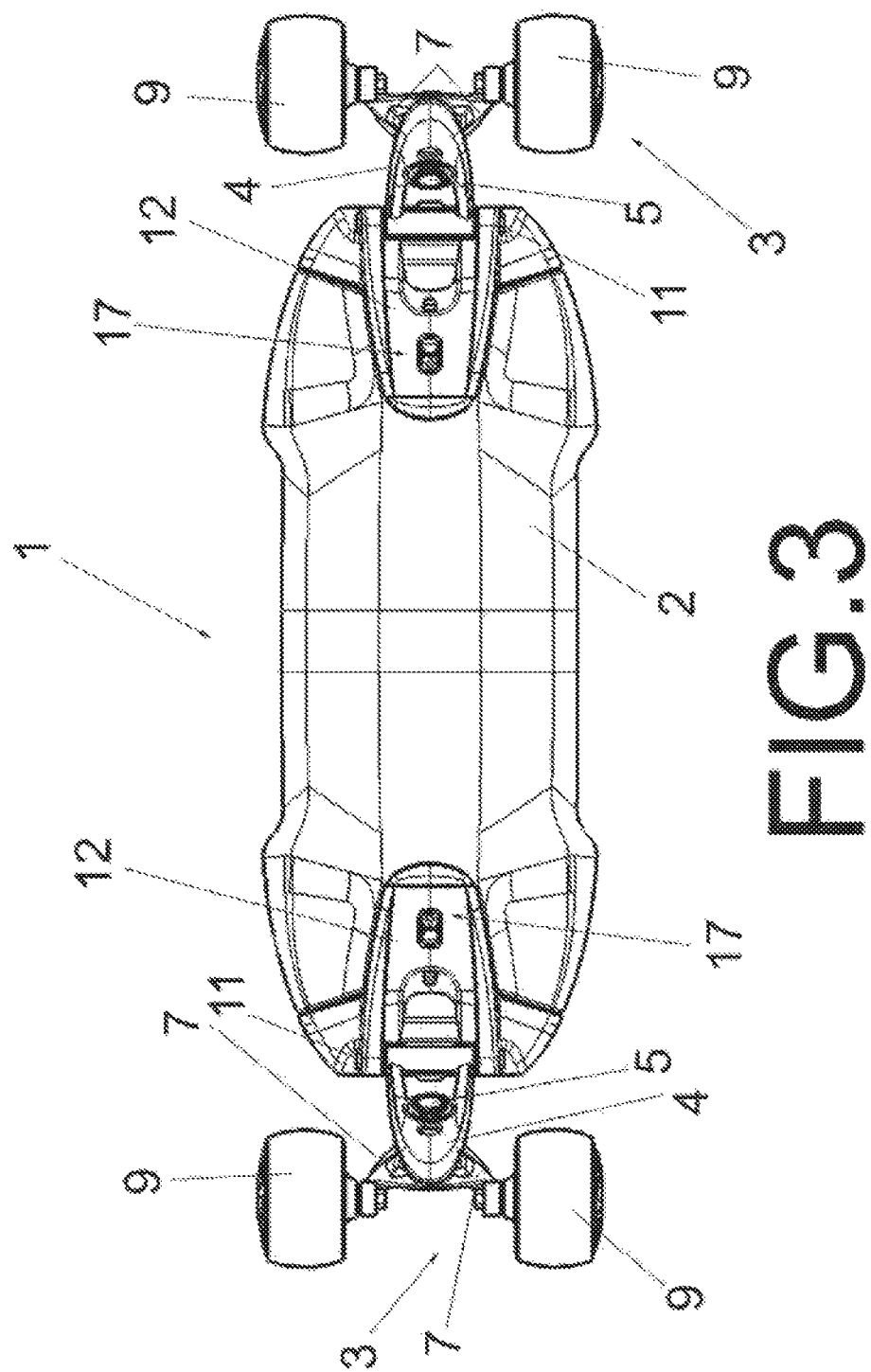
FIG. 3 shows a bottom view of the vehicle of FIG. 1.
Figure 4:
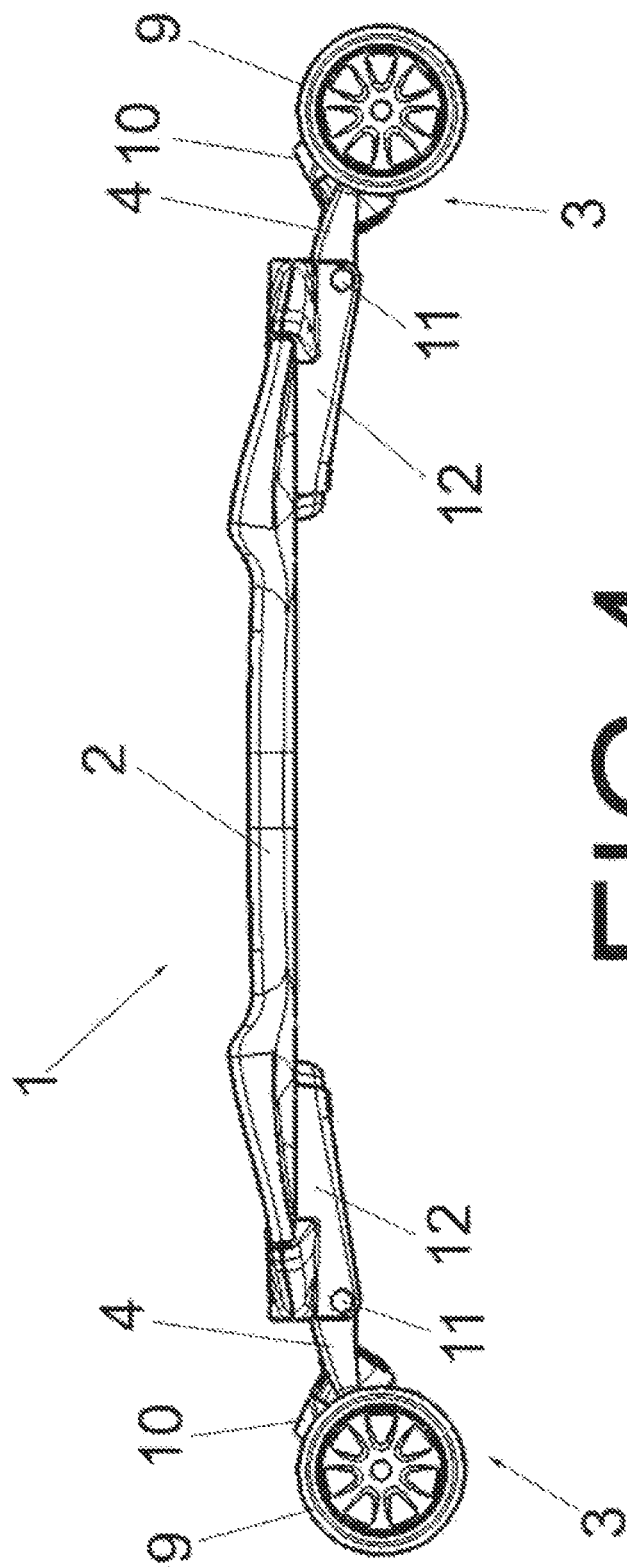
FIG. 4 shows a side view of the vehicle of FIG. 1.

An embodiment of the one-person vehicle claimed with reference to said figures is described below.

The vehicle 1 claimed is configured as a skateboard with a transport deck 2 for the user, trucks 3 for displacement of the transport deck 2 and control arms 4 that are attached to the ends of the table 2 so that they can pivot on the trucks 3 when the deck is swung to change the travelling direction of the vehicle 1.

As shown in the figures, in the vehicle using position, the trucks 3 are located on the outside of the transport deck 2, attached to each end of the control arms 4 through a pivot 5 which it is inserted in a cavity 6 provided in each of the control arms 4. Each of the trucks 3 has two support arms 7 on which the axles 8 of the wheels 9 are mounted. These support arms 7 extend in the longitudinal direction of the vehicle 1 to be located at a distal position from the pivot 5 of the same truck 3, and are connected configuring a "U" shaped structure 10 from whose central section 10a the pivot 5 extends facing the transport deck 2.

Figure 5:
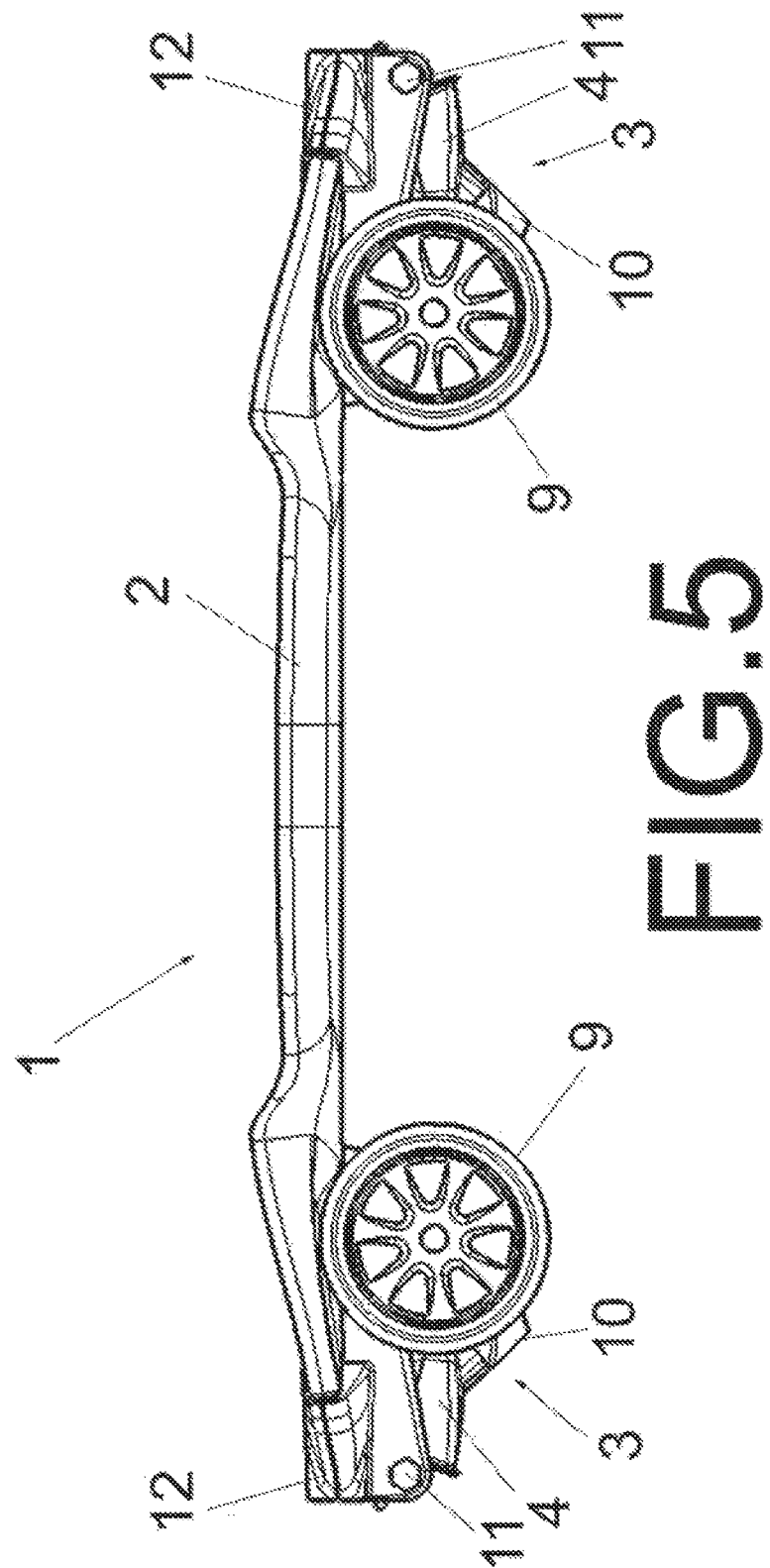
FIG. 5 shows a side view of the vehicle of FIG. 1 with the control arms and trucks in a retracted position below the transport deck.

In the embodiment described, the control arms 4 are pivotally connected to the transport deck 2 so that they can be moved vertically to a folding position below the deck 2 to facilitate transport and storage (see FIG. 5).

Figure 6:
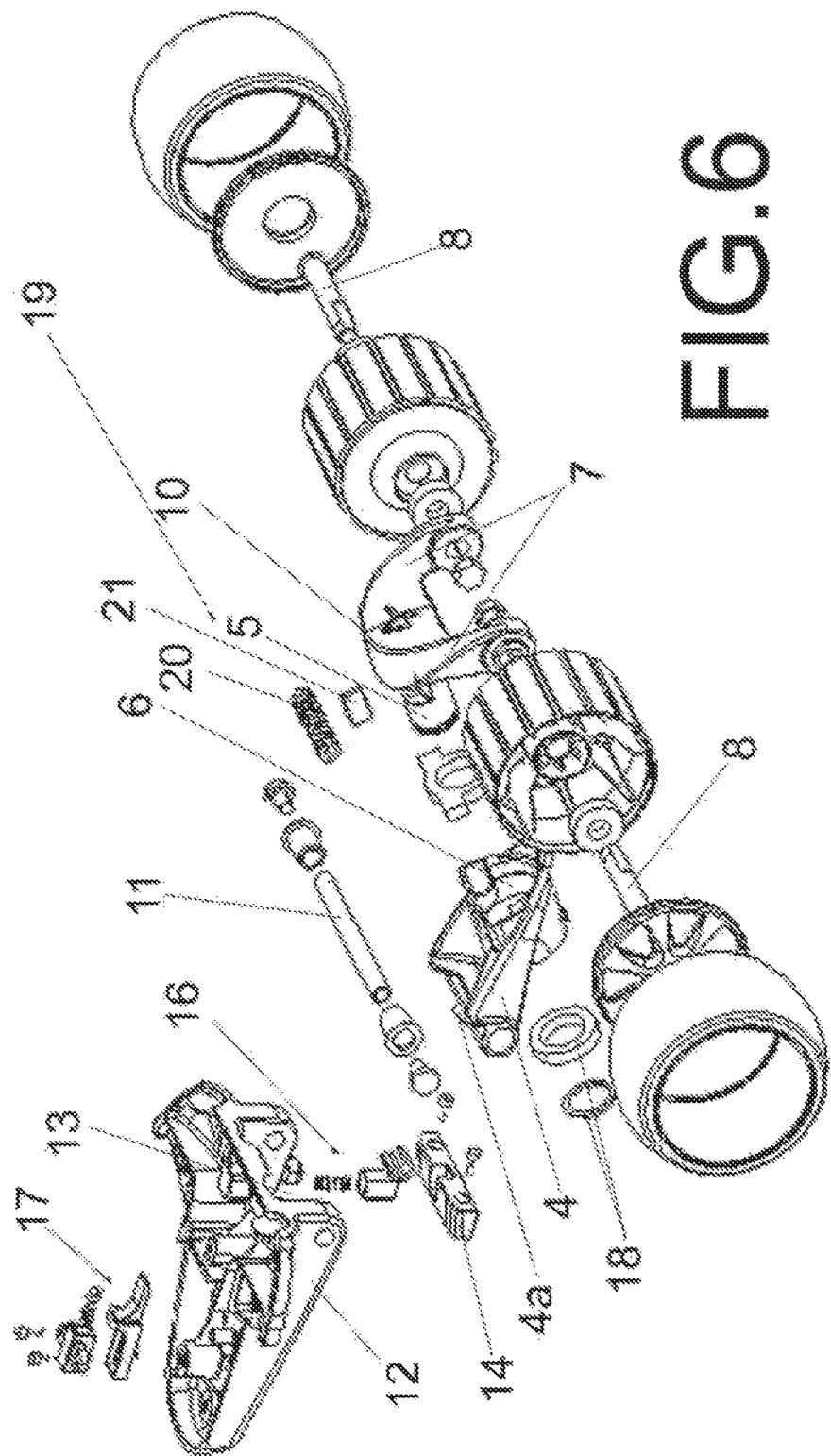
FIG. 6 shows an exploded view of an assembly comprising the truck, the control arm and coupling piece of the control arm at one end of the transport deck.

The articulated attachment of each of the control arms 4 takes place via hinge pins 11 mounted on each coupling piece 12 provided below the ends of the deck 2. Each of the coupling pieces 12 has a cavity 13 which houses the hinge axis 11 of a control arm 4 and a portion 4a of said control arm 4 designed to contact with a damper element 14. In the embodiment described, this damping element 14 is a pad of elastomeric material housed in the cavity 13 of a coupling piece 12 (see FIG. 6). However, this damping element 14 may be, instead of a pad 14, a spring or a block of compressed air or another similar element to ensure the absorption of vibrations caused by the road.

In order to ensure the rigid connection of transport deck 2 and the control arms 4, the coupling pieces 12 each include a mechanism 16 to pressure-attach a portion 4a of the control arm 4 inside the cavity 13, and locking mechanism 17 that prevents accidental opening of the mechanism 16.

As discussed in the description of the invention, the pivot 5 of the trucks 3 is a hinge axis that is configured to be inserted into the cavity 6 of each of the control arms 4. This cavity 6 includes bearings 18 on which the axis or pivot 5 is supported.

The vehicle 1 claimed is characterized by the fact that each of the trucks 3 includes a damper assembly 19 which is interposed between the axis or pivot 5 and the control arm 4 which rotates about said axis or pivot 5.

Figure 7:
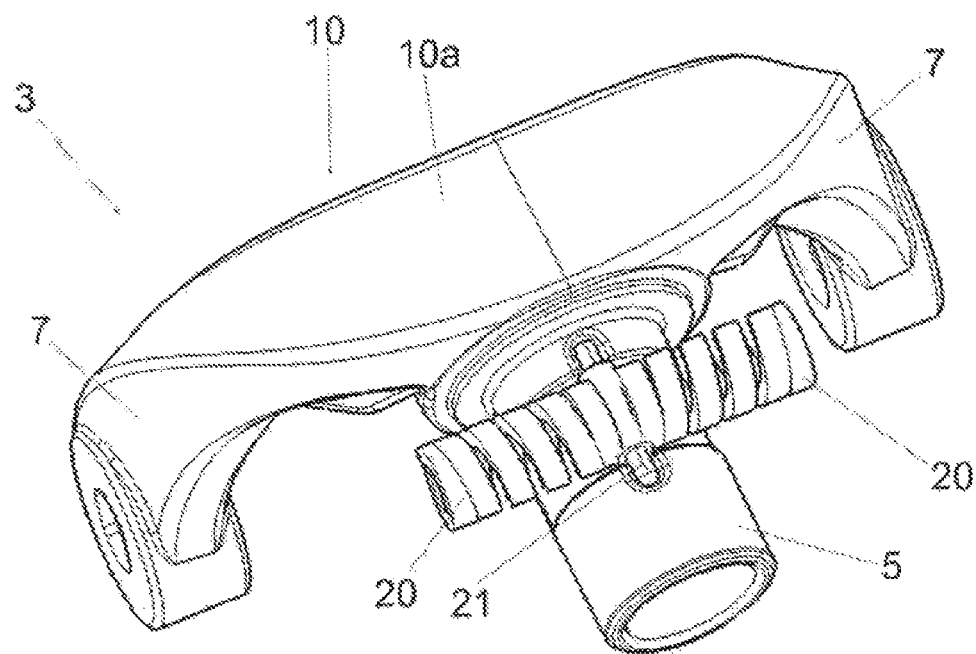
FIG. 7 is a perspective view of the overall structure of the truck showing the support arms of the wheel axles and pivot configured as a joint axis for inserting in a cavity of a control arm. This
Figure 8:
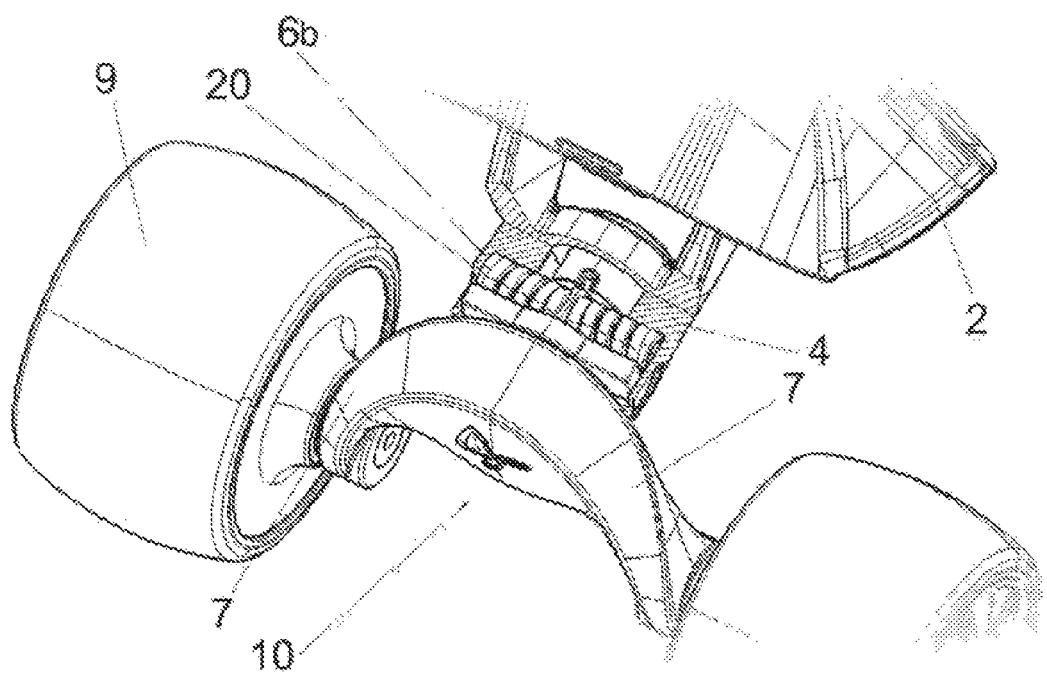
FIG. 8 is a perspective view showing a partial section of the cavity in the control arm housing the pivot and the damper assembly springs.

In the embodiment described, the damper assembly 19 includes a pair of springs 20 disposed on both sides of the axis or pivot 5 and separated by a plate 21 which is secured to the pivot or axis 5. These springs 20 are housed inside a cavity 6b of the control arms 4 which receive the axis or pivot 5 so that the walls of said cavity 6b and the axis itself act as physical stop for the ends of each of the springs 20 (see FIGS. 6, 7 and 8).

When the transport deck 2 oscillates by the user's weight force, the arm 4 that controls the truck 3 rotates about the axis or pivot 5 of the truck 3 acting on one of the springs 20 which is compressed into the cavity 6b to compensate in the control arm 4 the weight force that swings the deck 2. The same spring 20 drives the return to the centre of the control arm 4 when the force making the deck 2 oscillate yields.

As discussed in the description of the invention, unlike vehicles of the prior art, the vehicle 1 claimed is very stable and easy to manoeuvre, and driving requires no special skills, since the distance between the wheel axles 8 of both trucks 3 can be very large without this resulting in a loss of manoeuvrability. For example, the distance between the wheel axles 8 of the trucks 3 can be greater than 80 cm, and the diameter of the wheels 9 can be greater than 100 mm. The wheels 9 of large diameter facilitate the absorption of vibrations and, as discussed below, the motorization of the vehicle 1. Further, both the size of the wheels and the distance between axles does not cause a problem of space, since as described above, the control arms 4 of the trucks 3 can take folded position under the deck 2 which substantially reduces the length of the vehicle 1 and facilitates the transport.

Furthermore, in the embodiment described, the ends of the transport deck 2 including coupling pieces 12 define a substantially flat surface which is configured as a support to place the vehicle upright, once the control arms 4 are folded.

As has been mentioned in the description of the invention, in a preferred embodiment, not shown, the vehicle 1 is provided with an electric direct drive "brushless" type motor. This motor is attached to the axle 8 of one of the wheels 9 of the trucks 3 to rotate with it regardless of transmission belts or gears. The power of this motor may be, for example, only 175 W so that the electric battery required to actuate it is reduced in size. As a result, the weight of the motorized vehicle 1 may be less than 8 kg, again facilitating handling. The electric battery, lithium, can be housed in a compartment under the transport deck 2 and the supply cable can pass through a hole provided in the axis or pivot 5 to access the wheel 9 axle 8.

Figure 9:
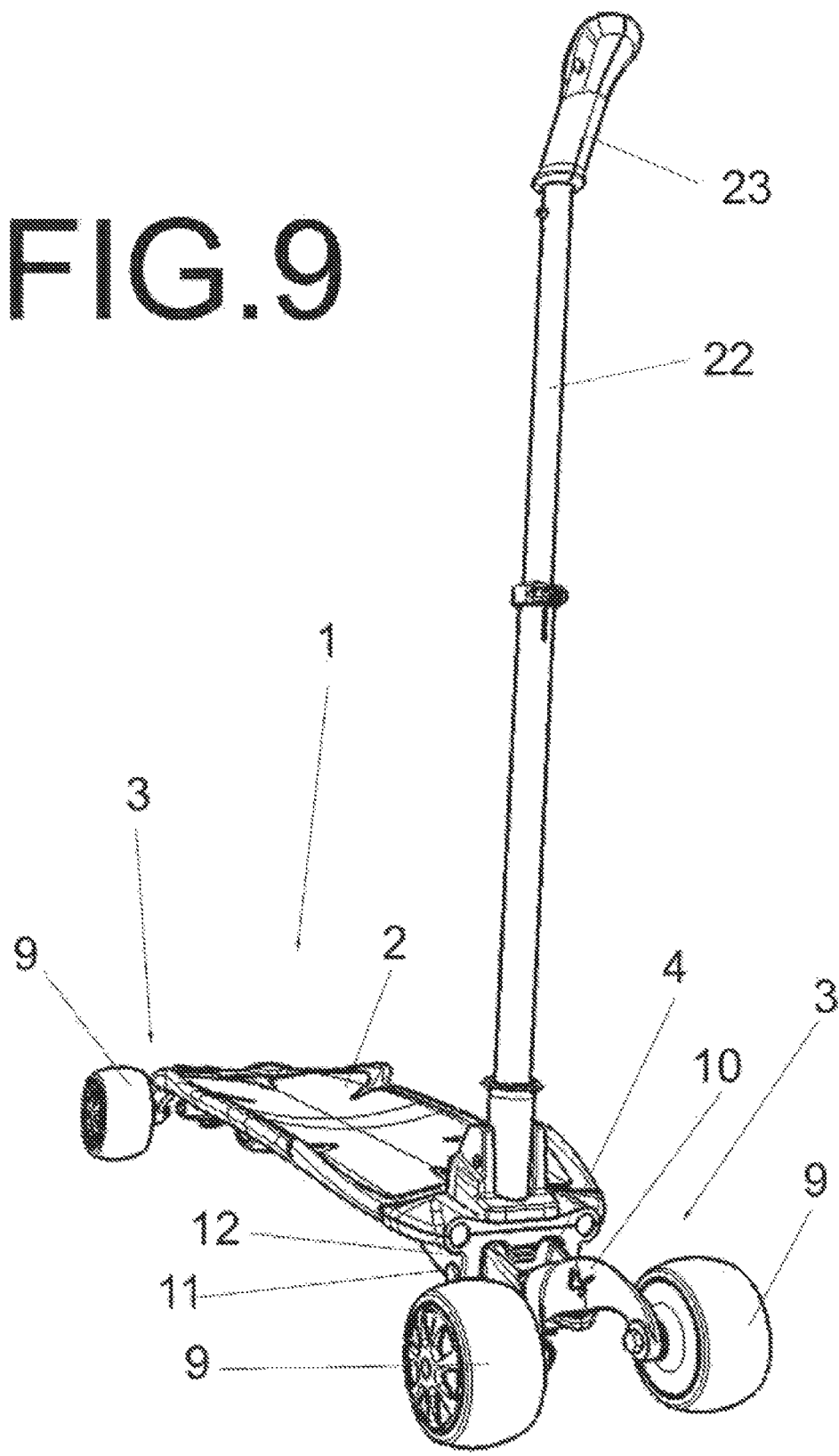
FIGS. 9 and 10 show two perspective views of the vehicle with mast.
Figure 10:
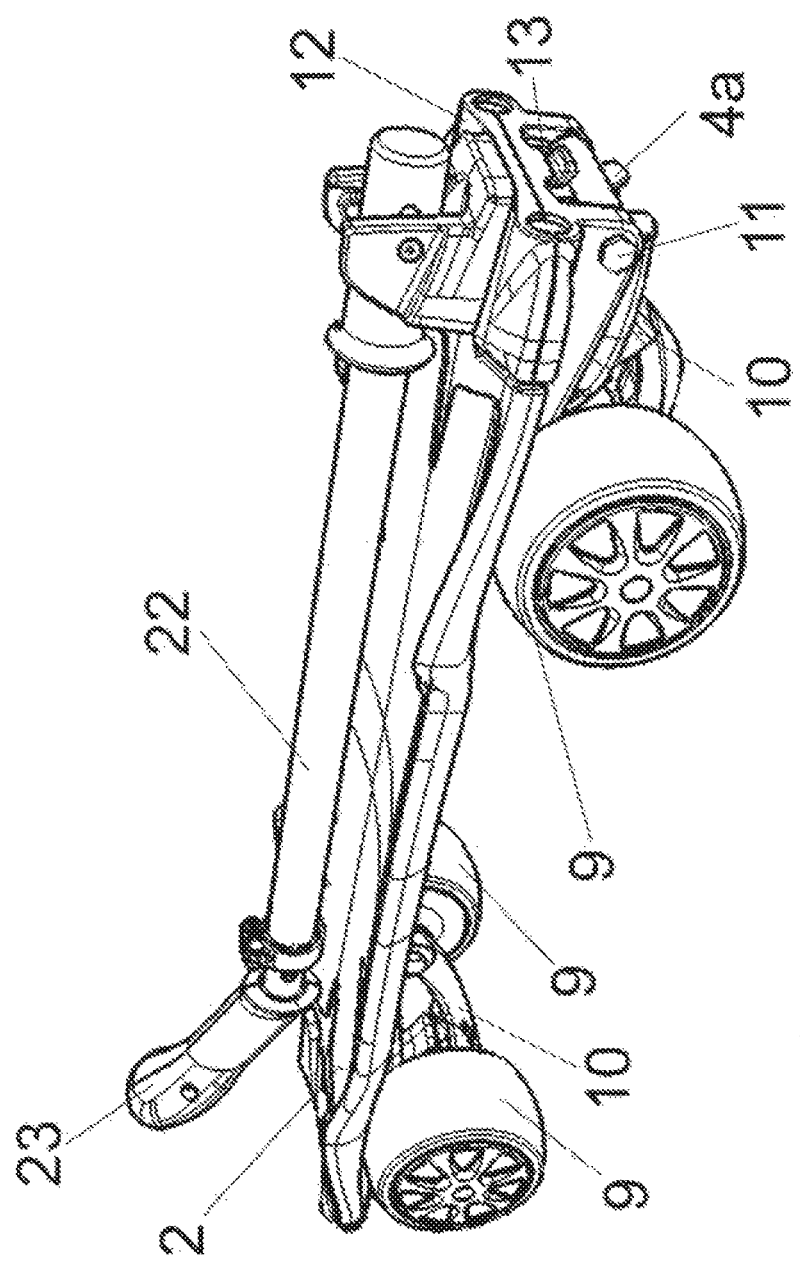

FIGS. 9 to 10 show a version of the vehicle 1 which includes a mast 21 that acts as a handle. This mast 22 includes a "joystick" type handle 23 configured to control the vehicle 1 with one hand. Moreover, the vehicle 1 also has a remote control (not shown) which controls the speed of the electric motor. The mast 22 is telescopic and is mounted in a collapsible manner on the transport deck 2 to take up little space (see FIG. 10).

In summary, the present invention provides a lightweight, stable and compact one-person vehicle 1, which is particularly suitable for use in urban areas, for short distances, "last-mile transportation". In addition, the vehicle 1 is designed so that it can be adapted or customized based on user needs. For example, the height of transport deck 2 or the minimum turning radius of the axle 8 of the wheels 9 can in turn be modified by varying the degree of opening of the joint connecting the control arms 4 to the transport deck 2. In the embodiment described, this can be done by varying the thickness of the damper pad 14 which is housed in the cavity 13 of the coupling pieces 12 in contact with a portion 4a of the control arms 4.

Although reference has been made to a specific embodiment of the invention, it is apparent to one skilled in the art that the vehicle 1 described is susceptible of numerous variations and modifications, and that all the details mentioned can be replaced with other technically equivalent ones without departing from the scope of protection defined by the appended claims. For example, although the embodiment shown in the figures described a damper assembly 19 including a pair of springs 20 disposed on both sides of the axis or pivot 5 of one of trucks 3, alternatively, said damper assembly 19 may be configured by a single spring disposed around the axis or pivot 5. This spring would be attached by one end to said axis or pivot 5 and the other end to a surface of the control arm 4 which would rotate on said axis or pivot 5.

What is claimed is:

1. A one-person vehicle for urban transport comprising a transport deck for one user of the vehicle, trucks for displacement of said transport deck, and control arms for said trucks which are attached to said transport deck so that they can pivot with respect to said trucks when the user swings the transport deck to change the travelling direction of the vehicle, characterized by the fact that each of said trucks comprises a pivot to be inserted into one of said control arms and a damper assembly which is interposed between the pivot and the control arm rotating about said pivot, said damper assembly being configured to compensate on said control arm the weight force that swings the deck and to actuate the return to the center of said control arm when the force yields.

2. The vehicle according to claim 1, wherein the pivot of each of said trucks is a hinge axis that is configured to be inserted into a cavity of the end of one of said control arms.

3. The vehicle according to claim 1, wherein each of said trucks comprises a pair of wheels and support arms supporting the axles of said wheels, said support arms extending in the longitudinal direction of the vehicle located at a distal position from the pivot or axis of the same truck.

4. The vehicle according to claim 3, wherein said support arms supporting the wheels are connected configuring a U-shaped structure, the pivot or axis of the same truck extending from the central section of said structure facing the transport deck.

5. The vehicle according to claim 1, wherein:
the pivot of each of said trucks is a hinge axis that is configured to be inserted into a cavity of the end of one of said control arms; and
said damper assembly comprises a pair of springs arranged on both sides of the pivot or axis of the truck, said springs being housed within a cavity of the control arm receiving said pivot or axis, the walls of said cavity and the axis or pivot itself acting as a physical stop for the ends of said springs.

6. The vehicle according to claim 1, wherein:
the pivot of each of said trucks is a hinge axis that is configured to be inserted into a cavity of the end of one of said control arms; and
said damper assembly comprises a spring disposed around the pivot or axis of a truck, one end of said spring being attached to said axis or pivot and the other end connected to a control arm.

7. The vehicle according to claim 1, wherein said control arms are pivotally attached to the transport deck, said articulated attachment allowing vertical movement of the control arms to a stowed position under the deck.

8. The vehicle according to claim 7, wherein each of the control arms is attached to one end of the transport deck through a hinge axis which is associated to a damper element configured to compensate vibrations from the roadway on which the vehicle runs.

9. The vehicle according to claim 8 comprising pieces for coupling to the ends of the transport deck comprising each of said coupling pieces a cavity which houses the hinge axis of each of the control arms and a damper element is configured to contact with a portion of the arms.

10. The vehicle according to claim 9, wherein said damper element comprises a pad of elastomeric material of predetermined thickness and hardness.

11. The vehicle according to claim 9, wherein each of the control arms comprises a portion of control arm which is configured to snap into the cavity of the coupling pieces, said vehicle including locking mechanisms to prevent accidental opening of said arms once inserted into the cavities.

12. The vehicle according to claim 1 comprising a direct drive electric motor connected to the axle of a wheel of said trucks, and a battery for supplying electrical power to said motor.

13. The vehicle according to claim 12, wherein said direct drive motor is housed inside a cylindrical casing serving as a wheel, the outer surface of said casing comprising a material acting as a tire.

14. The vehicle according to claim 12 comprising a remote control to operate the motor and a processing and control unit configured to drive the motor based on a signal from said remote control when the speed of the wheels of the vehicle exceeds a predetermined initial value.

15. The vehicle according to claim 1 comprising a mast vertically attached to the transport deck, said mast acting as a handle that facilitates the steering of the vehicle.

16. The vehicle according to claim 1, wherein:
each of said trucks comprises a pair of wheels and arms supporting the axles of said wheels, said support arms extending in the longitudinal direction of the vehicle located at a distal position from the pivot or axis of the same truck; and
the wheels of the trucks are of a diameter between 80 mm and 130 mm.

17. The vehicle according to claim 1 comprising a direct drive electric motor connected to the axle of a wheel of said trucks, a battery for supplying electrical power to said motor, and a mast vertically attached to the transport deck, said mast acting as a handle that facilitates the steering of the vehicle.

18. The vehicle according to claim 17, wherein said mast includes a "joystick" type handle for driving the vehicle with one hand.

19. The vehicle according to claim 17 further comprising:
a direct drive electric motor connected to the axle of a wheel of said trucks, and a battery for supplying electrical power to said motor; and
a remote control to operate the motor and a processing and control unit configured to drive the motor based on a signal from said remote control when the speed of the wheels of the vehicle exceeds a predetermined initial value;
wherein:
said handle includes a cavity for receiving the motor remote control.

\* \* \* \* \*

UNITED STATES PATENT AND TRADEMARK OFFICE
CERTIFICATE OF CORRECTION

PATENT NO. : 9,908,032 B2  
APPLICATION NO. : 15/325326  
DATED : March 6, 2018  
INVENTOR(S) : Xavier Garcia Elena Page 1 of 1

It is certified that error appears in the above-identified patent and that said Letters Patent is hereby corrected as shown below:

On the Title Page

Item (87), "PCT Pub. Date: Nov. 4, 2016" should read --Jan. 14, 2016--;

In the Specification

Column 1, Line 24, "control aims for" should read --control arms for--;

Column 2, Line 30, "the materiel of" should read --the material of--;

Column 2, Line 38, "of control arms" should read --of said control arms--;

Column 2, Line 39, "This hinge is" should read --This hinge axis is--;

Column 2, Line 56, "the pivot axle" should read --the pivot or axle--;

Column 3, Line 33, "said pieces a cavity" should read --said coupling pieces a cavity--;

Column 4, Line 25, "to show the vehicle" should read --to slow the vehicle--;

Column 6, Line 24, "can take folded" should read --can take a folded--; and

Column 7, Line 7, "one of trucks" should read --one of said trucks--.

Signed and Sealed this  
Fifteenth Day of May, 2018

Andrei Iancu  
*Director of the United States Patent and Trademark Office*